US010712862B1

(12) United States Patent
Kang et al.

(10) Patent No.: US 10,712,862 B1
(45) Date of Patent: Jul. 14, 2020

(54) OPEN/CLOSE DETECTION OF FOLDABLE TOUCH SCREEN USING TOUCH SCREEN CONTROLLER

(71) Applicant: STMicroelectronics Asia Pacific Pte Ltd, Singapore (SG)

(72) Inventors: Jm Kang, Seoul (KP); Alex Hong, Seoul (KP); Sj Koo, Uijeongbu (KP); Tim Kim, Yongin-si (KP); Shaun Park, Seoul (KP); Gary Lee, Songpa-gu/Seoul (KP)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 16/361,924

(22) Filed: Mar. 22, 2019

(51) Int. Cl.
*G06F 3/042* (2006.01)
*G06F 3/041* (2006.01)
*H04M 1/02* (2006.01)
*G06F 3/044* (2006.01)

(52) U.S. Cl.
CPC .......... *G06F 3/0416* (2013.01); *G06F 3/044* (2013.01); *H04M 1/0268* (2013.01); *G06F 2203/04102* (2013.01)

(58) Field of Classification Search
CPC ................. G06F 3/0416; G06F 3/044; G06F 2203/04102; H04M 1/0268
See application file for complete search history.

(56) References Cited

U.S. PATENT DOCUMENTS

| 5,717,556 | A | * | 2/1998 | Yanagida | H05K 1/0278 |
| | | | | | 174/254 |
| 8,804,347 | B2 | * | 8/2014 | Martisauskas | G06F 3/044 |
| | | | | | 361/749 |
| 9,274,562 | B2 | * | 3/2016 | Franklin | G06F 1/1626 |
| 9,874,974 | B2 | * | 1/2018 | Kim | G06F 3/044 |
| 10,411,084 | B2 | * | 9/2019 | Yeo | H01L 27/3288 |
| 2012/0062447 | A1 | * | 3/2012 | Tseng | G02F 1/133305 |
| | | | | | 345/33 |
| 2012/0127087 | A1 | * | 5/2012 | Ma | G06F 1/1616 |
| | | | | | 345/173 |
| 2012/0307423 | A1 | * | 12/2012 | Bohn | G06F 1/1641 |
| | | | | | 361/679.01 |
| 2014/0055429 | A1 | * | 2/2014 | Kwon | G06F 1/1643 |
| | | | | | 345/204 |

(Continued)

*Primary Examiner* — Joe H Cheng
(74) *Attorney, Agent, or Firm* — Crowe & Dunlevy (57) ABSTRACT

An electronic device includes a foldable touch screen having first and second portions and a bendable intermediate portion connecting the first portion to the second portion. The foldable touch screen has a capacitive touch matrix therein. A touch screen controller acquires touch data from the capacitive touch matrix, calculates strength values of nodes of the capacitive touch matrix based upon the acquired touch data, calculates a first value, the first value being an average strength of nodes of the capacitive touch matrix located in the first portion of the foldable touch screen, calculates a second value, the second value being an average strength of nodes of the capacitive touch matrix located in the second portion of the foldable touch screen, and determines that the foldable touch screen is in a closed position based upon the first value and the second value both being greater than a first given strength value.

31 Claims, 8 Drawing Sheets

(56) References Cited

U.S. PATENT DOCUMENTS

| | | | |
|---|---|---|---|
| 2014/0055702 A1* | 2/2014 | Park | G02F 1/136286 349/43 |
| 2015/0382446 A1* | 12/2015 | Kwon | H05K 1/028 174/251 |
| 2016/0093644 A1* | 3/2016 | Ki | H01L 29/78672 257/40 |
| 2016/0155788 A1* | 6/2016 | Kwon | H01L 27/3276 257/40 |

* cited by examiner

OPEN/CLOSE DETECTION OF FOLDABLE TOUCH SCREEN USING TOUCH SCREEN CONTROLLER

TECHNICAL FIELD

This disclosure is related to the field of touch screen controllers, and in particular, to the use of a touch screen controller to detect the open or closed position of a foldable touch screen.

BACKGROUND

The form factors of mobile phones have changed greatly since the development of the original mobile phones. For example, initial mobile phones were often "brick" shaped with a small screen for displaying user input entered via physical buttons. Over time with further development, the sizes of mobile phones shrunk, and new form factors, such as sliding phones and foldable phones, were introduced. A sliding phone or foldable phone utilized a two-piece case with a rigid screen carried by one piece of the case that was capable of moving with respect to the other piece of the case. Eventually, as touch screens replaced the combination of traditional screens with physical buttons, the form factors of mobile phones coalesced around a flat, rectangular shape carrying a rigid touch screen. This form factor has proven highly successful, with nearly all mobile phones sold today having this form factor.

However, as mobile operating systems continue to grow in complexity and capability, and as touch screens continue to increase in resolution, the desire for larger touch screens grows, to the point where many mobile phones sold today have a touch screen that measures over six inches in diagonal. There is a limit to this screen size growth however, namely the fact that many users carry their mobile phones in their pockets. Therefore, mobile phones themselves are somewhat limited in size.

As a solution to this issue, and to permit the size of touch screens to continue to grow while not increasing the size of mobile phones, some manufacturers have begun to develop foldable touch screens, with the aim of creating a foldable mobile phone having a large, foldable singular touch screen. With such foldable mobile phones, one form factor design concern becomes thickness when folded. Therefore, internal space is at a premium. Since a foldable mobile phone should be able to detect screen angle (open, closed, etc.) to provide desirable functions for users such as entry into and exit from sleep states, or display brightness control, with current designs, some of the internal space is unfortunately consumed using sensors such a gyroscopes, hall effect sensors, or optical sensors to detect the panel angle.

Therefore, it would be desirable for there to be hardware and techniques for determining the screen angle or open close detection without the use of such additional sensors. It would be particularly desirable if the screen angle could be determined using hardware that will necessarily be present in every foldable mobile phone with a touch screen, such as by using the touch screen itself to perform the detection.

So as to facilitate the discussion and understanding of the disclosures herein, a background on touch screen technology will now be given.

Touch screens typically operate based on capacitive touch sensing, and include a patterned array of conductive features. For instance, the patterned array of conductive features may include sets of lines, conductive pads, overlapping structures, interleaved structures, diamond structures, lattice structures, and the like. By evaluating changes in capacitance at different lines or sets of lines, a user touch or hover, such as by a finger or stylus, can be detected.

Figure 1A:
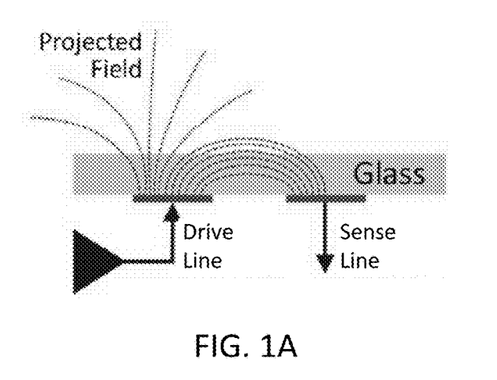
FIG. 1A is a diagram showing field lines of a touch sensor operating in a mutual capacitance sensing mode in an absence of a touch.
Figure 1B:
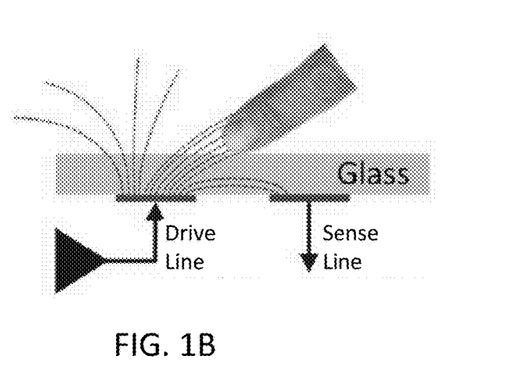
FIG. 1B is a diagram showing field lines of a touch sensor operating in a mutual capacitance sensing mode in a presence of a touch.

Two common capacitive touch sensing techniques or modes that may be performed on touch screens are mutual capacitance sensing and self capacitance sensing. In a mutual self capacitance sensing mode, shown in FIGS. 1A-1B, a drive signal is applied to a subset of the lines referred to as drive lines, and capacitance values are measured at a subset of the lines referred to as sense lines, with it being understood that the sense lines cross the drive lines in a spaced apart fashion therefrom to form a capacitive touch matrix. Each crossing of drive line and sense line forms a capacitive intersection. This electric field between a drive line and a sense line, in the absence of a touch, can be seen in FIG. 1A.

Since bringing a finger or conductive stylus near the surface of the touch screen changes the local electric field, this causes a reduction in the capacitance between the drive lines and the sense lines (the "mutual" capacitance), and the capacitance change at every individual capacitive intersection can be measured to accurately determine the touch location. This change of electric field due to the presence of a finger can be seen in FIG. 1B, where the finger "steals" charge, and thus the capacitance between the drive line and sense line is reduced.

Since mutual capacitance sensing allows the measuring of each intersection between drive line and sense line individually, the output of mutual capacitance sensing is a two-dimensional matrix of values, with one value for each capacitive intersection (crossing between drive line and sense line). Thus, it can be appreciated that mutual capacitance sensing allows multi-touch operation where multiple fingers or styli can be accurately tracked at the same time.

Figure 2A:
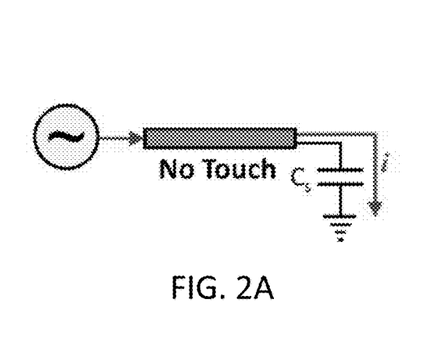
FIG. 2A is a diagram showing capacitances of a touch sensor operating in a touch strength capacitance sensing mode in an absence of a touch.
Figure 2B:
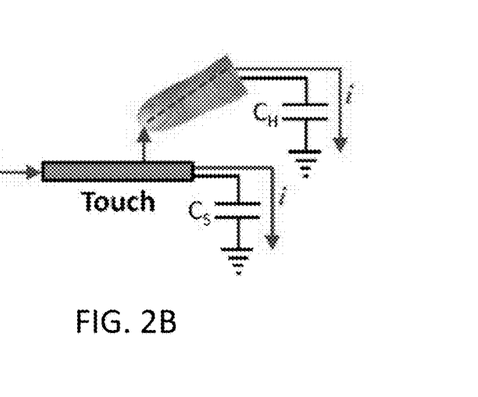
FIG. 2B is a diagram showing capacitances of a touch sensor operating in a touch strength capacitance sensing mode in a presence of a touch.

In a self capacitance sensing mode, shown in FIGS. 2A-2B, the drive signal is applied to every line, regardless of orientation. This application of the drive signal in the absence of a touch can be seen in FIG. 2A. Bringing a finger or conductive stylus near the surface of the touch screen changes the local electric field, as shown in FIG. 2B, increasing the capacitance between the drive line or sense line of interest and ground (the "self capacitance") in this instance. However, since all lines are driven, the capacitance change cannot be measured on a per capacitive intersection basis. Therefore, the output of self capacitance sensing is two one dimensional arrays of values, with one value for each line.

SUMMARY

Various aspects are disclosed herein. A first aspect is directed to an electronic device including a foldable touch screen with a first portion, a second portion, and a bendable intermediate portion connecting the first portion to the second portion. The foldable touch screen has a capacitive touch matrix therein. A touch screen controller is configured to acquire touch data from the capacitive touch matrix, calculate strength values of nodes of the capacitive touch matrix based upon the acquired touch data, and calculate a first value, the first value being an average strength of nodes of the capacitive touch matrix located in the first portion of the foldable touch screen. The touch screen controller is further configured to calculate a second value, the second value being an average strength of nodes of the capacitive touch matrix located in the second portion of the foldable touch screen, and determine that the foldable touch screen is in a closed position based upon the first value and the second value both being greater than a first given strength value.

The first value may be an average strength of nodes of the capacitive touch matrix located adjacent a distal end of the first portion of the foldable touch screen, the distal end of the first portion of the foldable touch screen being opposite to the bendable intermediate portion. In addition, the second value may be an average strength of nodes of the capacitive touch matrix located adjacent a distal end of the second portion of the foldable touch screen, the distal end of the second portion of the foldable touch screen being opposite to the bendable intermediate portion.

The touch screen controller may be further configured to calculate a third value, the third value being an average strength of: nodes of the capacitive touch matrix located in the first portion of the foldable touch screen but not located adjacent the distal end of the first portion of the foldable touch screen, nodes of the capacitive touch matrix located in the second portion of the foldable touch screen but not located adjacent the distal end of the second portion of the foldable touch screen, and nodes of the capacitive touch matrix located in the bendable intermediate portion of the foldable touch screen. The touch screen controller may determine that the foldable touch screen is in the closed position based upon the first value and the second value both being greater than the first given strength value and the third value being less than a second given strength value.

The second given strength value may be less than the first given strength value.

The second given strength value may be equal to the first given strength value.

The touch screen controller may be further configured to determine that the foldable touch screen is in an open position based upon the first value and the second value both being less than the first given strength value.

The touch screen controller may be further configured to determine a location of a touch to the foldable touch screen from the calculated strength values based upon at least one of the first value and the second value not being greater than the first given strength value (based on the first value not being greater than the first given strength value, or based on the second value not being greater than the first given strength value).

The touch screen controller may acquire the touch data from less than all nodes of the capacitive touch matrix, and may calculate the strength values only of nodes from which touch data was acquired.

The nodes are may be capacitive intersections of drive lines and sense lines.

A second aspect disclosed herein is a touch screen controller including input circuitry configured to acquire touch data from a capacitive touch matrix and a controller. The controller is configured to calculate strength values of nodes of the capacitive touch matrix based upon the acquired touch data, and calculate a first value, the first value being an average strength of nodes of the capacitive touch matrix located adjacent a first end of the capacitive touch matrix. The controller is further configured to calculate a second value, the second value being an average strength of nodes of the capacitive touch matrix located adjacent a second end of the capacitive touch matrix opposite the first end. The controller is further configured to determine that a foldable touch screen in which the capacitive touch matrix is located is in a closed position based upon the first value and the second value both being greater than a first given strength value.

The controller may be further configured to calculate a third value, the third value being an average strength of nodes of the capacitive touch matrix not used when calculating the first value and not use when calculating the second value. The controller may determine that the foldable touch screen is in the closed position based upon the first value and the second value both being greater than the first given strength value and the third value being less than a second given strength value.

The second given strength value may be less than the first given strength value.

The second given strength value may be equal to the first given strength value.

The controller may be further configured to determine that the foldable touch screen is in an open position based upon the first value and the second value both being less than the first given strength value.

The controller may acquire the touch data from less than all nodes of the capacitive touch matrix, and may calculate the strength values only of nodes from which touch data was acquired.

A third aspect is directed to a touch screen controller including drive circuitry configured to apply a drive signal to lines of a capacitive touch matrix located adjacent a first end of the capacitive touch matrix. Input circuitry is configured to acquire touch data from lines of the capacitive touch matrix located adjacent a second end of the capacitive touch matrix opposite the first end. A controller is configured to calculate strength values of nodes of the capacitive touch matrix based upon the acquired touch data, calculate a first value, the first value being an average strength of nodes of the capacitive touch matrix located adjacent the second end of the capacitive touch matrix, and determine that a foldable touch screen in which the capacitive touch matrix is located is in a closed position based upon the first value being greater than a first given strength value.

The drive circuitry may be further configured to apply the drive signal to at least some lines of the capacitive touch matrix not located adjacent the first end of the capacitive touch matrix and not located adjacent the second end of the capacitive touch matrix. The input circuitry may be further configured to acquire touch data from the at least some lines of the capacitive touch matrix not located adjacent the first end of the capacitive touch matrix and not located adjacent the second end of the capacitive touch matrix. The controller may be further configured to calculate a second value, the second value being an average strength of nodes of the capacitive touch matrix not used when calculating the first value. The controller may determine that the foldable touch screen is in the closed position based upon the first value being greater than the first given strength value and the second value being less than a second given strength value.

The second given strength value may be less than the first given strength value.

The second given strength value may be equal to the first given strength value.

The controller may be further configured to determine that the foldable touch screen is in an open position based upon the first value being less than the first given strength value.

A fourth aspect disclosed herein is a method including acquiring touch data from a capacitive touch matrix, calculating strength values of nodes of the capacitive touch matrix based upon the acquired touch data, and calculating a first value, the first value being an average strength of nodes of the capacitive touch matrix located adjacent a first end of the capacitive touch matrix. The method also includes calculating a second value, the second value being an average strength of nodes of the capacitive touch matrix located adjacent a second end of the capacitive touch matrix opposite the first end, and determining that a foldable touch screen in which the capacitive touch matrix is located is in a closed position based upon the first value and the second value both being greater than a first given strength value.

The method may also include calculating a third value, the third value being an average strength of nodes of the capacitive touch matrix not used when calculating the first value and not use when calculating the second value. The determination that the foldable touch screen is in the closed position may be based upon the first value and the second value both being greater than the first given strength value and the third value being less than a second given strength value.

The second given strength value may be less than the first given strength value.

The second given strength value may be equal to the first given strength value.

The method may include determining that the foldable touch screen is in an open position based upon the first value and the second value both being less than the first given strength value.

The touch data may be acquired from less than all nodes of the capacitive touch matrix, and the strength values of only nodes from which touch data was acquired are calculated.

A fifth aspect disclosed herein is a method including applying a drive signal to lines of a capacitive touch matrix located adjacent a first end of the capacitive touch matrix, acquiring touch data from lines of the capacitive touch matrix located adjacent a second end of the capacitive touch matrix opposite the first end, calculating strength values of nodes of the capacitive touch matrix based upon the acquired touch data, calculating a first value, the first value being an average strength of nodes of the capacitive touch matrix located adjacent the second end of the capacitive touch matrix, and determining that a foldable touch screen in which the capacitive touch matrix is located is in a closed position based upon the first value being greater than a first given strength value.

The method may include applying the drive signal to at least some lines of the capacitive touch matrix not located adjacent the first end of the capacitive touch matrix and not located adjacent the second end of the capacitive touch matrix, acquiring touch data from the at least some lines of the capacitive touch matrix not located adjacent the first end of the capacitive touch matrix and not located adjacent the second end of the capacitive touch matrix, and calculating a second value, the second value being an average strength of nodes of the capacitive touch matrix not used when calculating the first value. The foldable touch screen may be determined to be in the closed position based upon the first value being greater than the first given strength value and the second value being less than a second given strength value.

The second given strength value may be less than the first given strength value.

The second given strength value may be equal to the first given strength value.

The method may include determining that the foldable touch screen is in an open position based upon the first value being less than the first given strength value.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

Figure 3:
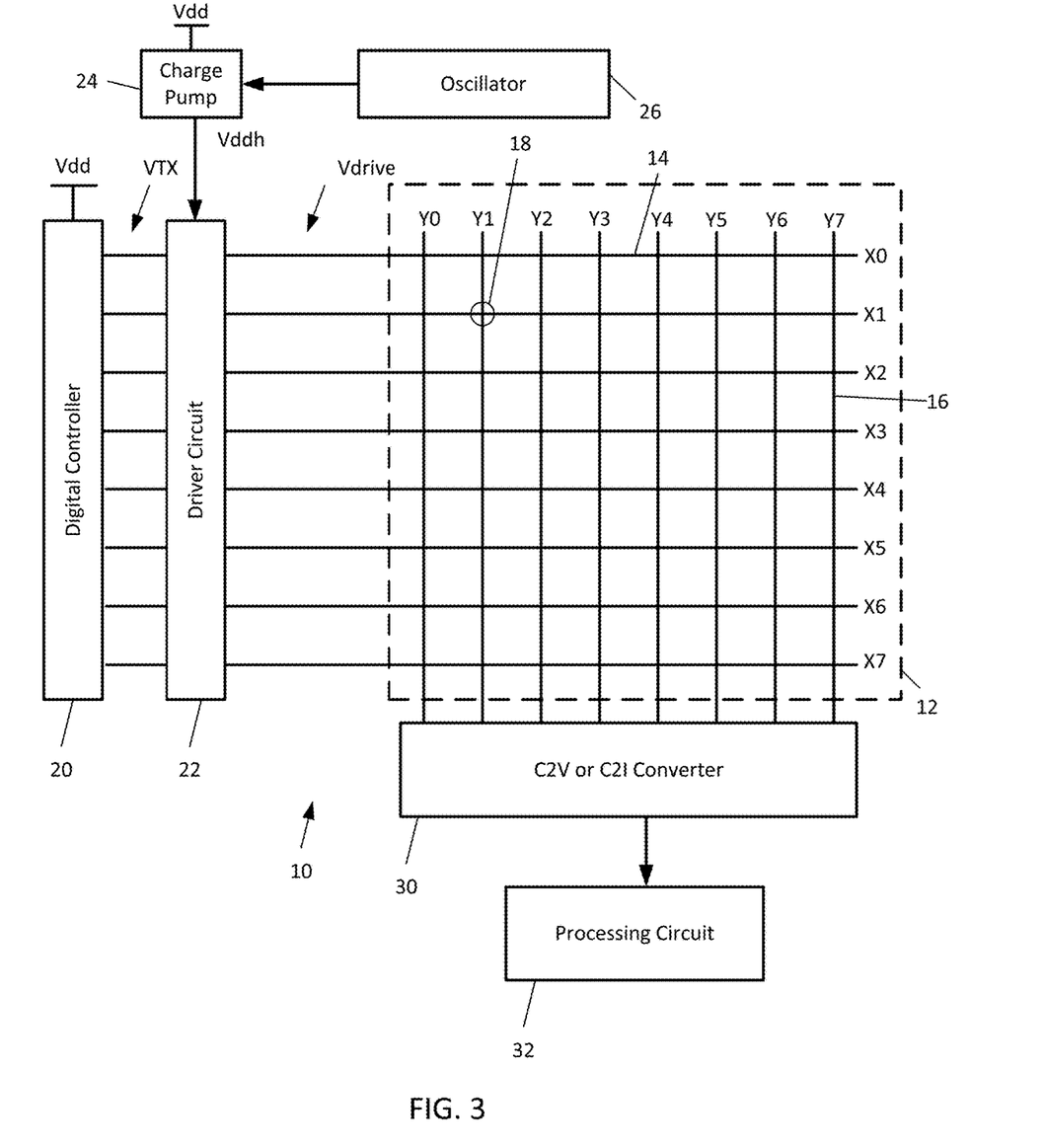
FIG. 3 is a block diagram of a touch screen controller in accordance with this disclosure.

A touch screen system 10 for use in a foldable mobile phone or tablet, and configured for operation using mutual capacitance sensing, is shown in FIG. 3. The touch screen system 10 includes a capacitive touch matrix 12 formed by a plurality of parallel drive lines 14 and a plurality of parallel sense lines 16. The drive lines 14 and sense lines 16 are formed of a transparent material (e.g., indium tin oxide ITO) so as to not obscure a visual display system (not shown) positioned underneath the capacitive touch matrix 12. The drive lines 14 and sense lines 16 can each be formed of a plurality of series connected diamond shapes. The drive lines 14 extend across the capacitive touch matrix 12 with a first orientation direction (for example, horizontal) and the sense lines extend across the capacitive touch matrix 12 with a second orientation direction (for example, vertical) such that the drive lines 14 cross over the sense lines 16 (or vice versa). However, the plane containing the drive lines 14 and the plane containing the sense lines 16 are separated from each other by a layer of dielectric material. A sense capacitor 18 is formed at each location where the lines 14 and 16 cross.

A digital controller circuit 20 generates an alternating current (AC) drive signal (VTX) in the form of a square wave, and sequentially applies that AC drive signal to the drive lines 14 through a driver circuit 22. The AC drive signal has a frequency fd that is in the range of 100-300 kHz, for example 200 kHz.

The digital controller circuit 20 is powered from a power supply voltage Vdd, with Vdd at 3.3V. The driver circuit 22 is powered from a power supply voltage Vddh, where Vddh>Vdd, with Vddh for example at 6V, 9V, 12V, 16V, or higher as needed. A charge pump circuit 24, powered from the power supply voltage Vdd, operates to boost the Vdd voltage to produce the Vddh voltage. An oscillator circuit 26 provides an AC signal 28 to the charge pump circuit 24 to control the boost switching operation of a flying capacitor that generates the Vddh voltage. The AC signal 28 has a frequency fo that is, for example, in the range of 10-100 MHz, for example at 48 MHz.

The driver circuit 22 includes a level shifting and buffering circuit to level shift the AC drive signal output from the digital controller circuit 20 from the Vdd voltage level to the Vddh voltage level to generate the level-shifted AC drive signal (Vdrive) for application to the drive lines 14.

A charge conversion circuit 30 such as a charge to voltage (C2V) converter circuit (or a charge to current (C2I) converter circuit) is coupled to the sense lines 16. The charge conversion circuit 30 senses the charge at each sense capacitor 18 and converts the sensed charge to an output signal (voltage or current) indicative of the sensed charge. The amount of charge at each sense capacitor 18 is a function of the AC drive signal, the capacitance between the drive line 14 and sense line 16 at the sense capacitor 18, and the influence of a touch capacitance contributed by the presence of an object (such as a finger or stylus) in proximity to the drive lines 14 and sense lines 16 of the capacitive touch matrix 12. A processing circuit 32 receives the output voltages from the charge conversion circuit 30 for each sense capacitor 18. The output voltages are processed to produce "strength" values, and analysis of those strength values is used to determine the presence (touch and/or hover) of the object and the location of the object.

Figure 4:
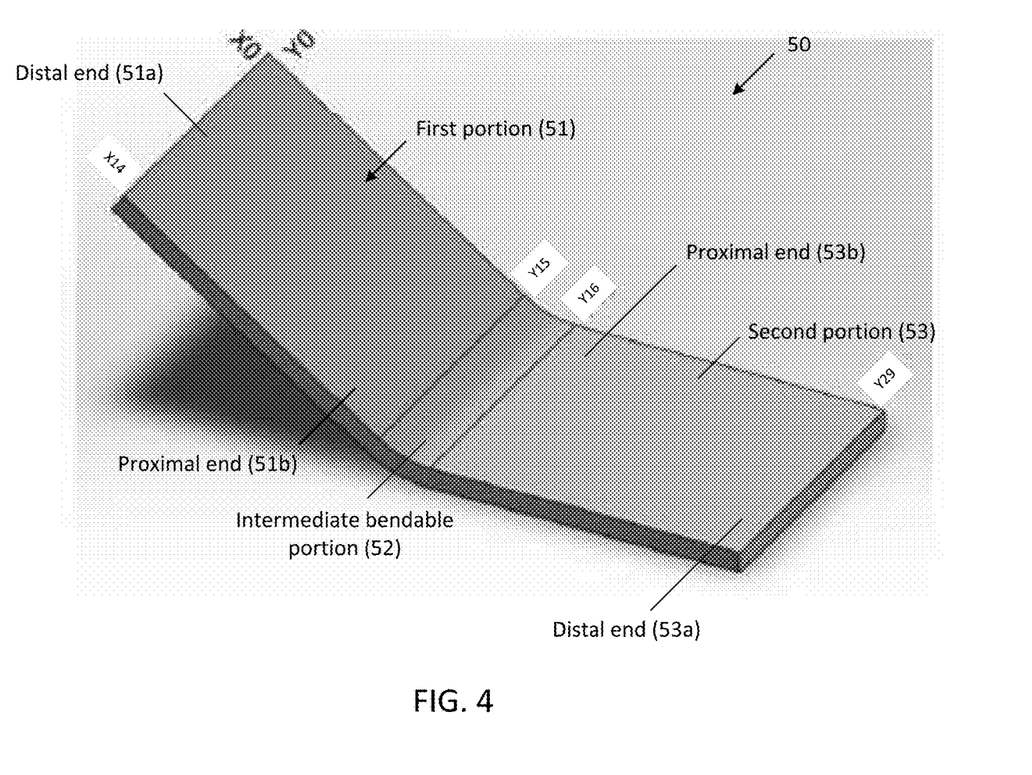
FIG. 4 is a perspective view of a mobile phone with a foldable touch screen.

The use of those strength values to determine whether a mobile phone 50 with a foldable touch screen is open or closed will be described, but first, for ease of understanding, portions of the mobile phone 50 will be defined and described. The mobile phone 50 has a bendable touch screen comprised of first portion 51, second portion 53, and intermediate bendable portion 52 connecting the first portion 51 and second portion 53. The first portion 51 has a distal end 51a and a proximal end 51b, while the second portion 53 has a distal end 53a and a proximal end 53b.

Note that the intermediate bendable portion 52 is not a break in the bendable touch screen, but is a portion of the bendable touch screen itself, and when the mobile phone 50 is in the open position, images are displayable across all portions of the bendable touch screen without any break in display. Therefore, it should be understood that a display layer and the capacitive touch matrix within the bendable touch screen are actually bendable and fold when the mobile phone 50 is in the closed position.

Lines Y0-Y29 represent vertical conductive lines (sense lines), while lines X0-X14 represent horizontal conductive lines (drive lines).

Figure 5:
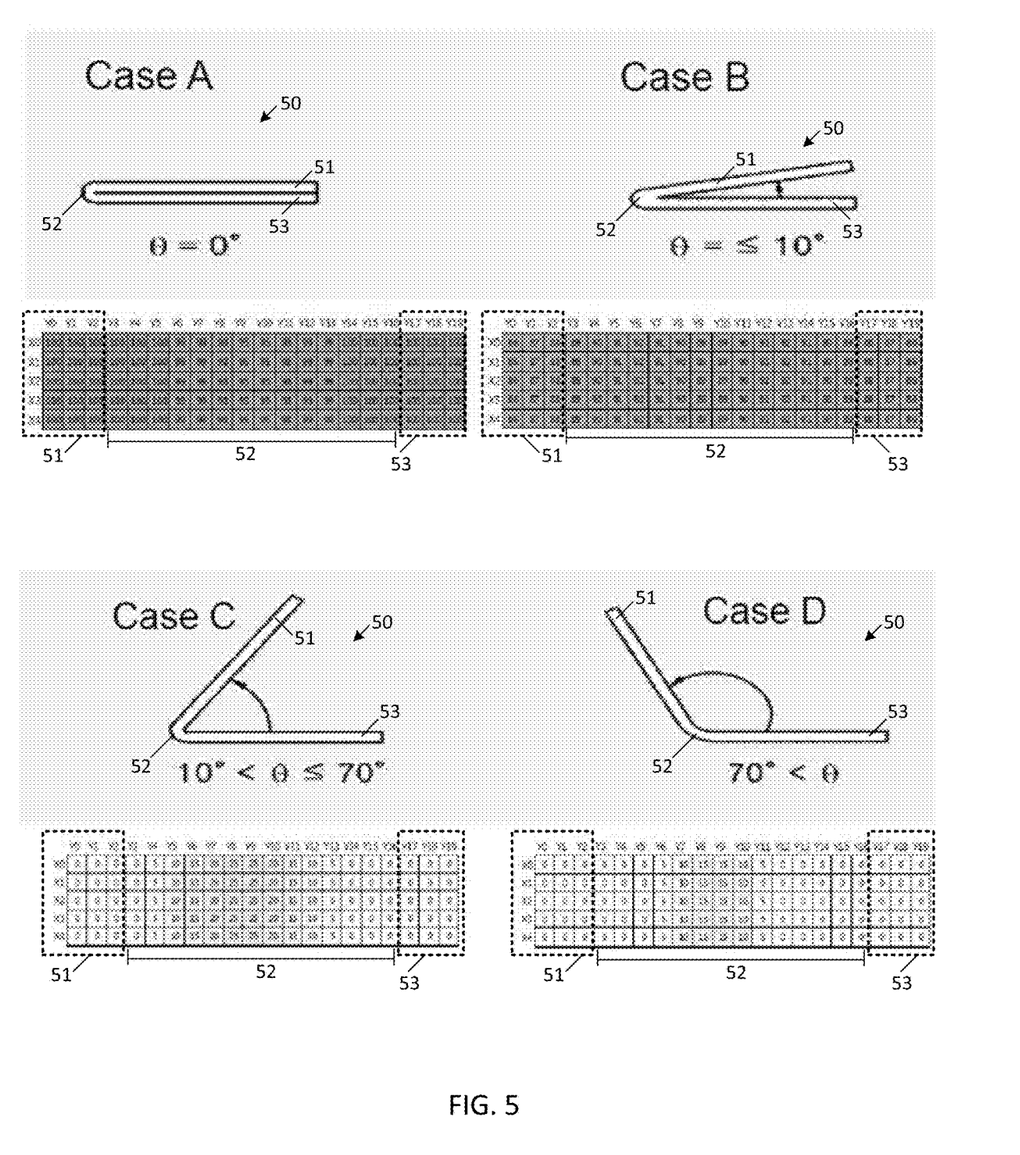
FIG. 5 is a diagram showing possible positions for a mobile phone with a foldable touch screen together with expected mutual capacitance strength values while in those positions.

Now refer to FIG. 5 for a general description use of strength values to determine whether the mobile phone 50 is open or closed will be described. Below each of "Case A", "Case B", "Case C", and "Case D" shown, there is a map of strength values collected using mutual touch sensing, having portions labeled 51, 52, and 53 that correspond to the strength values from the first portion 51, intermediate bendable portion 52, and second portion 53 of the foldable touch screen.

Note that for "Case A", where the mobile phone 50 is closed, the first portion 51 of the foldable touch screen and the second portion 53 of the foldable touch screen report the highest strength values while the intermediate bendable portion 52 also reports high strength values (yet these strength values are generally not as high as those of portions 51 and 53). From this it can be inferred that the mobile phone 50 is closed.

For "Case B", where the mobile phone 50 is open by 10°, the intermediate bendable portion 52 reports the highest strength values, while the first portion 51 of the foldable touch screen and the second portion 53 of the foldable touch screen also report high strength values (yet these strength values are generally not as high as those of the intermediate bendable portion 52), keeping in mind that the strength values of the intermediate bendable portion 52 for "Case B" are less than those reported for "Case A". From this it can be inferred that the mobile phone 50 is open at a small angle.

For "Case C", where the mobile phone 50 is open by more than 10° but no more than 70°, the first portion 51, the intermediate bendable portion 52, and the second portion 53 of the foldable touch screen all report low strength values, with the strength values of the intermediate bendable portion 52 being higher than those of the first portion 51 of the foldable touch screen and the second portion 53 of the foldable touch screen. From this, it can be inferred that the mobile phone 50 is open at an acute angle of more than 10° and no more than 70°.

Finally, for "Case D", where the mobile phone 50 is open by more than 70°, the relationships between the strength values of the first portion 51, the intermediate bendable portion 52, and the second portion 53 of the foldable touch screen are the same as in "Case C", with the strength values of the intermediate bendable portion 52 being higher than those of the first portion 51 of the foldable touch screen and the second portion 53 of the foldable touch screen, keeping in mind that the strength values of the intermediate bendable portion 52 for "Case "D" are less than those reported for "Case C". From this, it can be inferred that the mobile phone 50 is open at an obtuse angle or nearly at an obtuse angle, with the angle being more than 70°.

Keeping this general description in mind, a specific description of how to use the strength value relationships described above to determine the open or closed status of the mobile phone 50 will now be described with additional reference to FIGS. 6-7.

Figure 6:
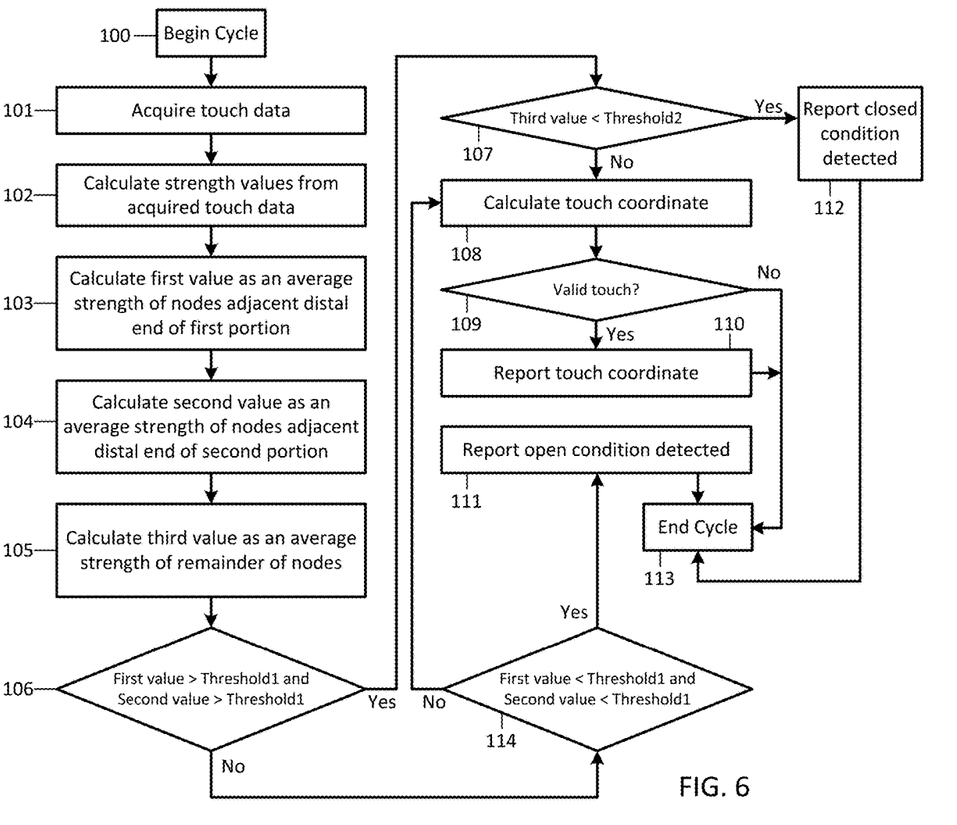
FIG. 6 is a flowchart of operation of the touch screen controller of FIG. 3 to perform open and closed detection of a mobile phone with a foldable touch screen.
Figure 7:
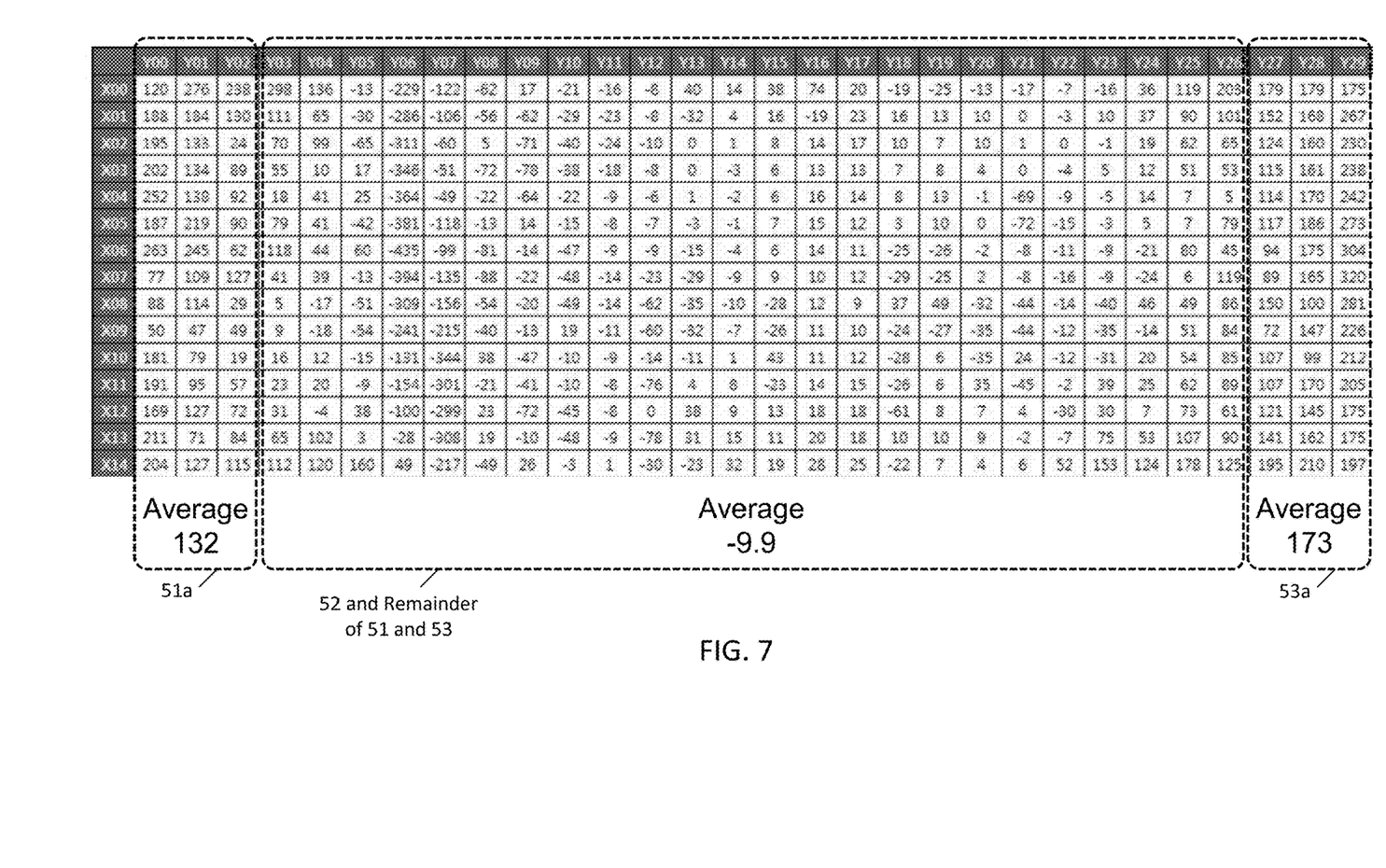
FIG. 7 is a graph of mutual capacitance strength values of a mobile phone with a foldable touch screen in a closed position.

Turning now to FIG. 6, techniques for using the bendable touch screen itself to determine whether the mobile phone 50 is in the open or closed position are now described. At the beginning of an open/closed sensing cycle (Block 100), touch data is acquired from the first portion 51, intermediate bendable portion 52, and second portion 53 (Block 101). Touch data may be acquired from all sense lines of the first portion 51, intermediate bendable portion 52, and second portion 53, or from less than all sense lines of one or more of the first portion 51, intermediate bendable portion 52, and second portion 53. For example, touch data may be acquired from sense nodes adjacent the distal end 51a of the first portion 51, from sense nodes adjacent the distal end 53a of the second portion 53, and not from other sense lines of the first and second portions 51, 53; in this example, touch data may be acquired from all, none, or some of the sense lines of the intermediate bendable portion 52.

Next, strength values are calculated from the acquired touch data (Block 102). For purposes of illustration, assume that touch data has been acquired from all sense lines of the first portion 51, intermediate bendable portion 52, and second portion 53, and the strength values calculated from such touch data can be seen in the graph of FIG. 7.

Then, a first value is calculated (Block 103). This first value is an average value of the strength values from (or adjacent) the distal end 51a of the first portion 51. Note that the nodes along the sense lines Y00, Y01, and Y02 (shown in FIG. 7) are those within the distal end 51a of the first portion 51, and that in the example shown, the average of these strength values is 132.

Next, a second value is calculated (Block 104). This second value is an average value of the strength values from (or adjacent) the distal end 53a of the second portion 53. The nodes along the sense lines Y27, Y28, and Y29 (shown in FIG. 7) are those within the distal end 53a of the second portion 53, and in the example shown, the average of those strength values is 173.

Thereafter, a third value is calculated (Block 105). This third value is an average value of the strength values from the remainder of the first portion 51 (those strength values not within the distal end 51a), the strength values from the intermediate bendable portion 52, and the remainder of the second portion 53 (those strength values not within the distal end 53a). The nodes along the sense lines Y03-Y26 (shown in FIG. 7) are those used for calculating this third value, and in the example shown, the average of those strength values is −9.9.

The first and second values (in the example of FIGS. 7, 132 and 173 respectively) are then compared to a first given strength value (Block 106), and in this example the first given strength value is 90. Since both the first and second values are greater than the first given strength value of 90, the third value is then compared to a second given strength value (Block 107), and in this example the second given strength value is 30. Since the third value of −9.9 is less than the second given strength value of 30, then it can be inferred that the mobile phone 50 is in the closed condition, that closed condition can be reported (Block 112), and the cycle can then end (Block 113).

If either of the first value and the second value had not been greater than the first given strength value (at Block 106), then it is checked whether both of the first value and second value are less than the first given strength value (Block 114). If both the first value and the second value are less than the first given strength value, and if the reported state of the mobile phone 50 was closed prior to the current cycle, then it can be inferred that the mobile phone 50 has been moved to the open position from the closed position, the open position can be reported (Block 111), and the cycle can then end (Block 113). If one (but not both) of the first value and the second value was less than the first given strength value (at Block 114), then a touch coordinate is calculated from the strength values (Block 108). The touch coordinate and strength values are then analyzed to determine whether the touch was a valid touch (Block 109). If the touch is determined to be valid, then the touch coordinate is reported (Block 110), and the cycle can then end (Block 113). If the touch is not determined to be valid, then the cycle ends (Block 113) without reporting the touch coordinate.

Figure 8:
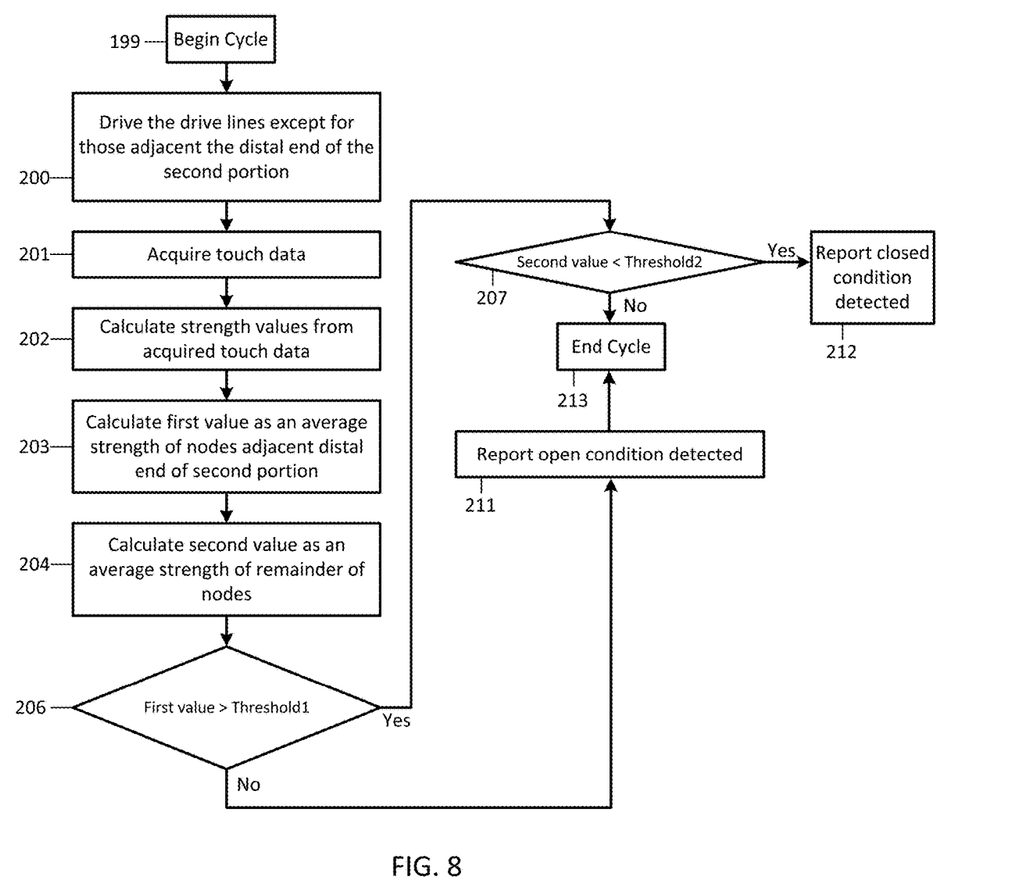
FIG. 8 is a flowchart of operation of the touch screen controller of FIG. 3 in an alternative embodiment to perform open and closed detection of a mobile phone with a foldable touch screen.

Another example in which a unique form of mutual capacitance sensing is used with the distal ends 51a and 53a is now described with reference to FIG. 8.

At the beginning of an open/closed sensing cycle (Block 199), all drive lines are driven as usual for mutual capacitance sensing as described above with the exception being those adjacent the distal end 53a of the second portion 53 (Block 200). Then, touch data is acquired from the sense lines other than those sense lines adjacent the distal end 51a of the first portion 51 (Block 201).

Next, strength values are calculated from the acquired touch data (Block 202). Then, a first value is calculated (Block 203). This first value is an average value of the strength values from (or adjacent) the distal end 53a of the second portion 53. Next, a second value is calculated (Block 204). This second value is an average value of the strength values from the remainder of those nodes for which touch data was acquired.

The first value is then compared to a first given strength value (Block 206). If the first values is greater than the first given strength value, the second value is then compared to a second given strength value (Block 207), and if the second value is less than the second given strength value it can be inferred that the mobile phone 50 is in the closed condition, and that closed condition can be reported (Block 212), and the cycle can then end (Block 213).

If the first value was not greater than the first given strength value (at Block 206), and if the reported state of the mobile phone 50 was closed prior to the current cycle, then it can be inferred that the mobile phone 50 has been moved to the open position from the closed position, the open position can be reported (Block 211), and the cycle can then end (Block 213).

Although the first given strength value and second given strength value are described as having different values, with the second given strength value being less than the first given strength value, in some instances, the first and second given strength values may be the same.

Figure 9A:
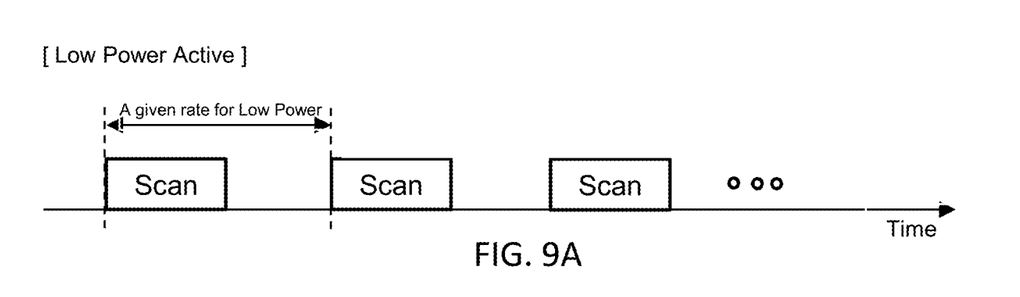
FIG. 9A is a graph showing operation of the touch screen controller of FIG. 3 in a low power active mode.
Figure 9B:
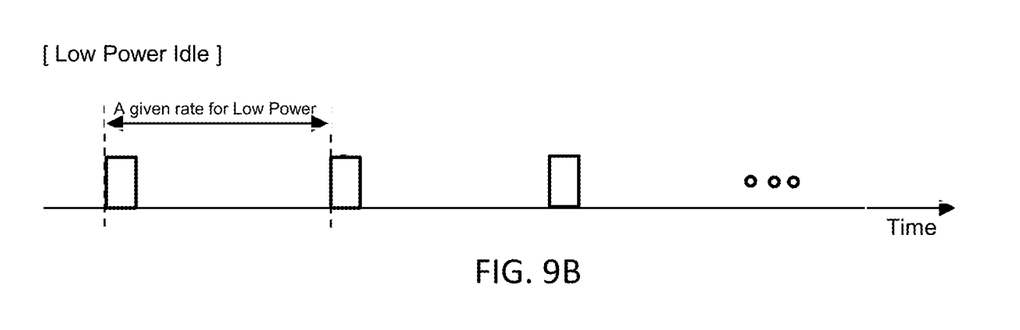
FIG. 9B is a graph showing operation of the touch screen controller of FIG. 3 in a low power idle mode.

The open and close position detection described above may be used in any sensing mode used by the mobile phone 50. For example, as shown in FIG. 9A, a low power active mode may be used in which the scanning (touch data acquisition) period is greater than in a low power idle mode shown in FIG. 9B. The low power idle mode may be used instead of the low power active mode, however.

Although the above techniques have been described as being performed upon touch data and strength values obtained using mutual capacitance sensing, it should be understood that they are equally applicable to touch data and strength values obtained using self capacitance sensing.

The above techniques may be used alone as described in which case robust performance is obtained, or may be used in conjunction with sensors such as a Hall effect sensor, accelerometer, or image sensor (or in fact any sort of sensor) to help ensure even greater accuracy of the open and closing detection.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. An electronic device, comprising:
a foldable touch screen comprising a first portion, a second portion, and a bendable intermediate portion connecting the first portion to the second portion, the foldable touch screen having a capacitive touch matrix therein; and
a touch screen controller configured to:
acquire touch data from the capacitive touch matrix;
calculate strength values of nodes of the capacitive touch matrix based upon the acquired touch data;
calculate a first value, the first value being an average strength of nodes of the capacitive touch matrix located in the first portion of the foldable touch screen;
calculate a second value, the second value being an average strength of nodes of the capacitive touch matrix located in the second portion of the foldable touch screen; and
determine that the foldable touch screen is in a closed position based upon the first value and the second value both being greater than a first given strength value.

2. The electronic device of claim 1, wherein the first value is an average strength of nodes of the capacitive touch matrix located adjacent a distal end of the first portion of the foldable touch screen, the distal end of the first portion of the foldable touch screen being opposite to the bendable intermediate portion; and wherein the second value is an average strength of nodes of the capacitive touch matrix located adjacent a distal end of the second portion of the foldable touch screen, the distal end of the second portion of the foldable touch screen being opposite to the bendable intermediate portion.

3. The electronic device of claim 1,
wherein the touch screen controller is further configured to calculate a third value, the third value being an average strength of: nodes of the capacitive touch matrix located in the first portion of the foldable touch screen but not located adjacent the distal end of the first portion of the foldable touch screen, nodes of the capacitive touch matrix located in the second portion of the foldable touch screen but not located adjacent the distal end of the second portion of the foldable touch screen, and nodes of the capacitive touch matrix located in the bendable intermediate portion of the foldable touch screen; and
wherein the touch screen controller determines that the foldable touch screen is in the closed position based upon the first value and the second value both being greater than the first given strength value and the third value being less than a second given strength value.

4. The electronic device of claim 3, wherein the second given strength value is less than the first given strength value.

5. The electronic device of claim 3, wherein the second given strength value is equal to the first given strength value.

6. The electronic device of claim 1, wherein the touch screen controller is further configured to determine that the foldable touch screen is in an open position based upon the first value and the second value both being less than the first given strength value.

7. The electronic device of claim 1, wherein the touch screen controller is further configured to determine a location of a touch to the foldable touch screen from the calculated strength values based upon at least one of the first value and the second value not being greater than the first given strength value.

8. The electronic device of claim 1, wherein the touch screen controller acquires the touch data from less than all nodes of the capacitive touch matrix, and calculates the strength values only of nodes from which touch data was acquired.

9. The electronic device of claim 1, wherein the nodes are at capacitive intersections of drive lines and sense lines.

10. A touch screen controller, comprising:
input circuitry configured to acquire touch data from a capacitive touch matrix; and
a controller configured to:
calculate strength values of nodes of the capacitive touch matrix based upon the acquired touch data;
calculate a first value, the first value being an average strength of nodes of the capacitive touch matrix located adjacent a first end of the capacitive touch matrix;
calculate a second value, the second value being an average strength of nodes of the capacitive touch matrix located adjacent a second end of the capacitive touch matrix opposite the first end; and
determine that a foldable touch screen in which the capacitive touch matrix is located is in a closed position based upon the first value and the second value both being greater than a first given strength value.

11. The touch screen controller of claim 10,
wherein the controller is further configured to calculate a third value, the third value being an average strength of nodes of the capacitive touch matrix not used when calculating the first value and not used when calculating the second value; and
wherein the controller determines that the foldable touch screen is in the closed position based upon the first value and the second value both being greater than the first given strength value and the third value being less than a second given strength value.

12. The touch screen controller of claim 11, wherein the second given strength value is less than the first given strength value.

13. The touch screen controller of claim 11, wherein the second given strength value is equal to the first given strength value.

14. The touch screen controller of claim 10, wherein the controller is further configured to determine that the foldable touch screen is in an open position based upon the first value and the second value both being less than the first given strength value.

15. The touch screen controller of claim 10, wherein the controller acquires the touch data from less than all nodes of the capacitive touch matrix, and calculates the strength values only of nodes from which touch data was acquired.

16. A touch screen controller, comprising:
drive circuitry configured to apply a drive signal to lines of a capacitive touch matrix located adjacent a first end of the capacitive touch matrix;
input circuitry configured to acquire touch data from lines of the capacitive touch matrix located adjacent a second end of the capacitive touch matrix opposite the first end; and
a controller configured to:
calculate strength values of nodes of the capacitive touch matrix based upon the acquired touch data;

calculate a first value, the first value being an average strength of nodes of the capacitive touch matrix located adjacent the second end of the capacitive touch matrix; and determine that a foldable touch screen in which the capacitive touch matrix is located is in a closed position based upon the first value being greater than a first given strength value.

17. The touch screen controller of claim 16, wherein the drive circuitry is further configured to apply the drive signal to at least some lines of the capacitive touch matrix not located adjacent the first end of the capacitive touch matrix and not located adjacent the second end of the capacitive touch matrix;

wherein the input circuitry is further configured to acquire touch data from the at least some lines of the capacitive touch matrix not located adjacent the first end of the capacitive touch matrix and not located adjacent the second end of the capacitive touch matrix;

wherein the controller is further configured to calculate a second value, the second value being an average strength of nodes of the capacitive touch matrix not used when calculating the first value; and wherein the controller determines that the foldable touch screen is in the closed position based upon the first value being greater than the first given strength value and the second value being less than a second given strength value.

18. The touch screen controller of claim 17, wherein the second given strength value is less than the first given strength value.

19. The touch screen controller of claim 17, wherein the second given strength value is equal to the first given strength value.

20. The touch screen controller of claim 16, wherein the controller is further configured to determine that the foldable touch screen is in an open position based upon the first value being less than the first given strength value.

21. A method, comprising:

acquiring touch data from a capacitive touch matrix;

calculating strength values of nodes of the capacitive touch matrix based upon the acquired touch data;

calculating a first value, the first value being an average strength of nodes of the capacitive touch matrix located adjacent a first end of the capacitive touch matrix;

calculating a second value, the second value being an average strength of nodes of the capacitive touch matrix located adjacent a second end of the capacitive touch matrix opposite the first end; and determining that a foldable touch screen in which the capacitive touch matrix is located is in a closed position based upon the first value and the second value both being greater than a first given strength value.

22. The method of claim 21, further comprising calculating a third value, the third value being an average strength of nodes of the capacitive touch matrix not used when calculating the first value and not use when calculating the second value; and wherein determining that the foldable touch screen is in the closed position is based upon the first value and the second value both being greater than the first given strength value and the third value being less than a second given strength value.

23. The method of claim 22, wherein the second given strength value is less than the first given strength value.

24. The method of claim 22, wherein the second given strength value is equal to the first given strength value.

25. The method of claim 21, further comprising determining that the foldable touch screen is in an open position based upon the first value and the second value both being less than the first given strength value.

26. The method of claim 21, wherein the touch data is acquired from less than all nodes of the capacitive touch matrix, and the strength values of only nodes from which touch data was acquired are calculated.

27. A method, comprising:

applying a drive signal to lines of a capacitive touch matrix located adjacent a first end of the capacitive touch matrix;

acquiring touch data from lines of the capacitive touch matrix located adjacent a second end of the capacitive touch matrix opposite the first end;

calculating strength values of nodes of the capacitive touch matrix based upon the acquired touch data;

calculating a first value, the first value being an average strength of nodes of the capacitive touch matrix located adjacent the second end of the capacitive touch matrix; and determining that a foldable touch screen in which the capacitive touch matrix is located is in a closed position based upon the first value being greater than a first given strength value.

28. The method of claim 27, further comprising:

applying the drive signal to at least some lines of the capacitive touch matrix not located adjacent the first end of the capacitive touch matrix and not located adjacent the second end of the capacitive touch matrix;

acquiring touch data from the at least some lines of the capacitive touch matrix not located adjacent the first end of the capacitive touch matrix and not located adjacent the second end of the capacitive touch matrix; and calculating a second value, the second value being an average strength of nodes of the capacitive touch matrix not used when calculating the first value; and wherein determining that the foldable touch screen is in the closed position is based upon the first value being greater than the first given strength value and the second value being less than a second given strength value.

29. The method of claim 28, wherein the second given strength value is less than the first given strength value.

30. The method of claim 28, wherein the second given strength value is equal to the first given strength value.

31. The method of claim 27, further comprising determining that the foldable touch screen is in an open position based upon the first value being less than the first given strength value.

* * * * *